United States Patent
Tanaka et al.

(10) Patent No.: US 7,155,260 B2
(45) Date of Patent: Dec. 26, 2006

(54) PORTABLE TERMINAL

(75) Inventors: Eiichi Tanaka, Kawasaki (JP); Yoko Fujii, Kawasaki (JP); Keigo Matsunaga, Kawasaki (JP); Tomohiro Yoshii, Kawasaki (JP); Keizo Ito, Kawasaki (JP); Yoshikazu Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 750 days.

(21) Appl. No.: 10/062,770

(22) Filed: Feb. 5, 2002

(65) Prior Publication Data

US 2003/0073466 A1 Apr. 17, 2003

(30) Foreign Application Priority Data

Oct. 16, 2001 (JP) ............... 2001-318004

(51) Int. Cl.
*H04M 1/00* (2006.01)

(52) U.S. Cl. ............ 455/566; 455/556.2; 455/557; 455/3.05; 455/90.1; 345/467

(58) Field of Classification Search ............... 455/3.05, 455/556.2, 557, 410, 411, 566; 345/810, 345/467
See application file for complete search history.

(56) References Cited

FOREIGN PATENT DOCUMENTS

| EP | 0 917 037 | * | 5/1999 |
|----|-----------|---|--------|
| EP | 0917037 A |   | 5/1999 |
| EP | 1 130 886 | * | 9/2001 |
| EP | 1130886 A |   | 9/2001 |

OTHER PUBLICATIONS

"Smart Application Selection Assistant", IBM® Technical Disclosure Bulletin, vol. 38, No. 02, Feb. 1995, pp. 353-355.

* cited by examiner

*Primary Examiner*—Nick Corsaro
*Assistant Examiner*—Alan T. Gantt
(74) *Attorney, Agent, or Firm*—Staas & Halsey LLP

(57) ABSTRACT

A portable terminal displays a menu screen in which small screens respectively corresponding to categories are shown on display positions of a display unit, wherein the display positions respectively correspond to operation positions of an operation panel.

3 Claims, 4 Drawing Sheets

PORTABLE TERMINAL

BACKGROUND OF THE INVENTION

1. Field of the Invention

The present invention relates to a portable terminal such as mobile phone, PHS (Personal Handyphone System) phone, etc. for performing radio communication with a base station.

2. Description of the Related Art

In recent years, mobile phones and PHS phones have explosively prevailed. These mobile phones, PHS phones, etc. (hereinafter represented by "mobile phone") generally have liquid crystal display (LCD) screens and operation panels on which plural operation buttons are arranged. In recent years, models with larger LCD screens and models with more variable functions have appeared.

If functions are too variable, there is a problem that operation of keys becomes complicated and it is difficult to remember such operation. To solve this problem, the way that variable menu screens are displayed on an LCD screen and a choice is selected on these menu screens has been adopted. However, the present condition is that it is difficult to remember even which operation button should be pressed to display a desired menu screen.

SUMMARY OF THE INVENTION

In view of the forgoing, it is an object of the present invention to provide a portable terminal having improved operability.

In order to achieve the above object, the present invention provides a portable terminal comprising:

a display unit for displaying a screen;

an operation panel for generating an event according to an operation position; and a display control unit for displaying, in response to a predetermined menu display operation performed on the operation panel, a first menu screen in which a plurality of small screens corresponding to a plurality of categories associated with a plurality of operation positions of the operation panel are shown on each of a plurality of display positions of the display unit respectively associated with the plurality of operation positions, as well as for displaying, in response to that any of the operation positions is operated in a state that the first menu screen is displayed on the display unit, a second menu screen which corresponds to one of the categories associated with one of the small screens displayed on one of the display positions of the display unit corresponding to the operated operation position.

The portable terminal according to the present invention displays the first menu screen showing the small screens corresponding to the categories on the display positions corresponding to the operation positions of the operation panel. Therefore, by looking at the first menu screen and operating an operation position corresponding to a display position of a small screen associated with a desired category, it is possible to reach the desired category without fail even if correspondence between the categories and the display positions is not precisely remembered, and further, operability can be greatly improved.

Here, in the portable terminal according to the present invention, it is preferable that the display control unit displays a predetermined receipt-waiting screen on the display unit when the portable terminal is turned on, and displays the first menu screen designed to show that the small screens are superimposed on the receipt-waiting screen, in response to the menu display operation.

By displaying the first menu screen showing that the small screens are superimposed on the receipt-waiting screen, it is possible to easily recognize that this first menu screen is the menu screen that appears first for selecting a category.

Also, in the portable terminal according to the present invention, it is preferable that, in response to that any of the operation positions is operated in a state that the first menu screen is displayed on the display unit, the display control unit displays the second menu screen designed to show that a menu corresponding to a category is provided on a background screen associated with the category which corresponds to a small screen displayed on a display position of the display unit corresponding to the operated operation position.

By displaying a background screen corresponding to a second menu screen on the second menu screen, it is easy to notice a category of the second menu screen, and even if there is an operational mistake, it is possible to find such a mistake early.

DESCRIPTION OF THE PREFERRED EMBODIMENTS

Figure 1:
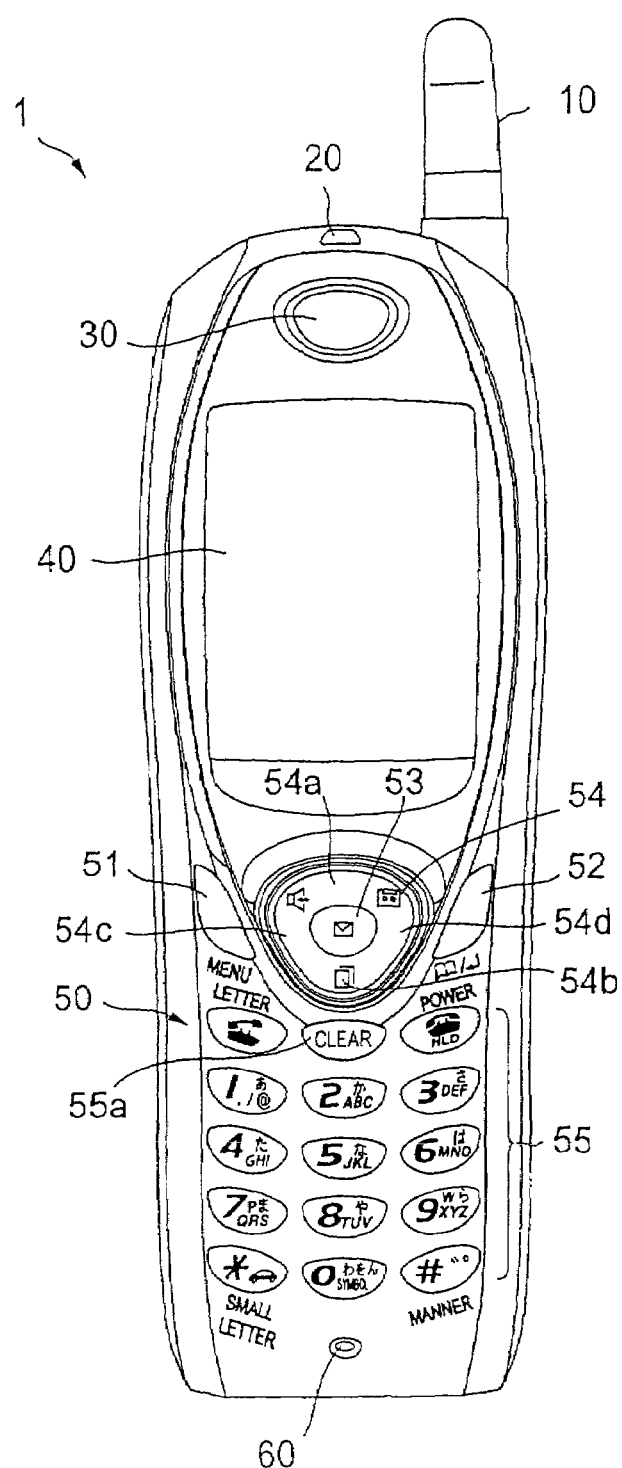
FIG. 1 is an external view of a mobile phone 1 as an example of the portable terminal according to the present invention.

FIG. 1 is an external view of a mobile phone as an example of the portable terminal according to the present invention.

A mobile phone 1 shown in FIG. 1 has, as main components, an antenna 10 for transmitting and receiving radio waves, a light emitting unit 20 with LED in its inside for indicating receipt of a call and a charging state by emitting lights, a message sending unit 30 with a speaker (a speaker 100 shown in FIG. 2) in its inside for hearing a voice by putting it to an ear, an LCD unit 40 for displaying various screens, an input operation unit 50 having more than one key, a message receiving unit 60 with a microphone (a microphone 110 shown in FIG. 2) in its inside for picking up a voice of a person, and a terminal for battery charging (not shown) arranged below the message receiving unit 60.

In the light emitting unit 20, there is a window on which a light transmitting member is fixed and which is formed at an aperture provided in a cover of the mobile phone 1, and a bicolor LED 150 composed of a green LED 151 and a red LED 152 and a light sensor 155 are arranged close to each other in the inside of the light emitting unit 20. The light sensor 155 detects brightness around the mobile phone 1. In the upper part of the input operation unit 50, simple push button type keys 51, 52 and 53 are arranged in the left, right and center part respectively, and a key 54 of which structure will be explained later is arranged around the key 53 in the center. That is, the key 54 has a structure having the upper part 54a, the lower part 54b, the left part 54c and the right part 54*d* that are pushed, and it is possible to perform key inputs by pushing these four parts of the key 54 in distinction from each other.

Here, the key 51 is called a menu key or a left soft key, the key 52 is called a right soft key, the key 53 in the center is called a decision key, and further, the upper part 54*a*, the lower part 54*b*, the left part 54*c* and the right part 54*d* of the key 54 are respectively called an upper key, a lower key, a left key and a right key.

Also, in the lower part below the part in which the keys 51-54 of the input operation unit 50 are arranged, a group of keys 55 of which number is 15(3×5=15) is arranged. In the group of fifteen keys 55, there is a clear key 55*a* that will be explained later.

Figure 2:
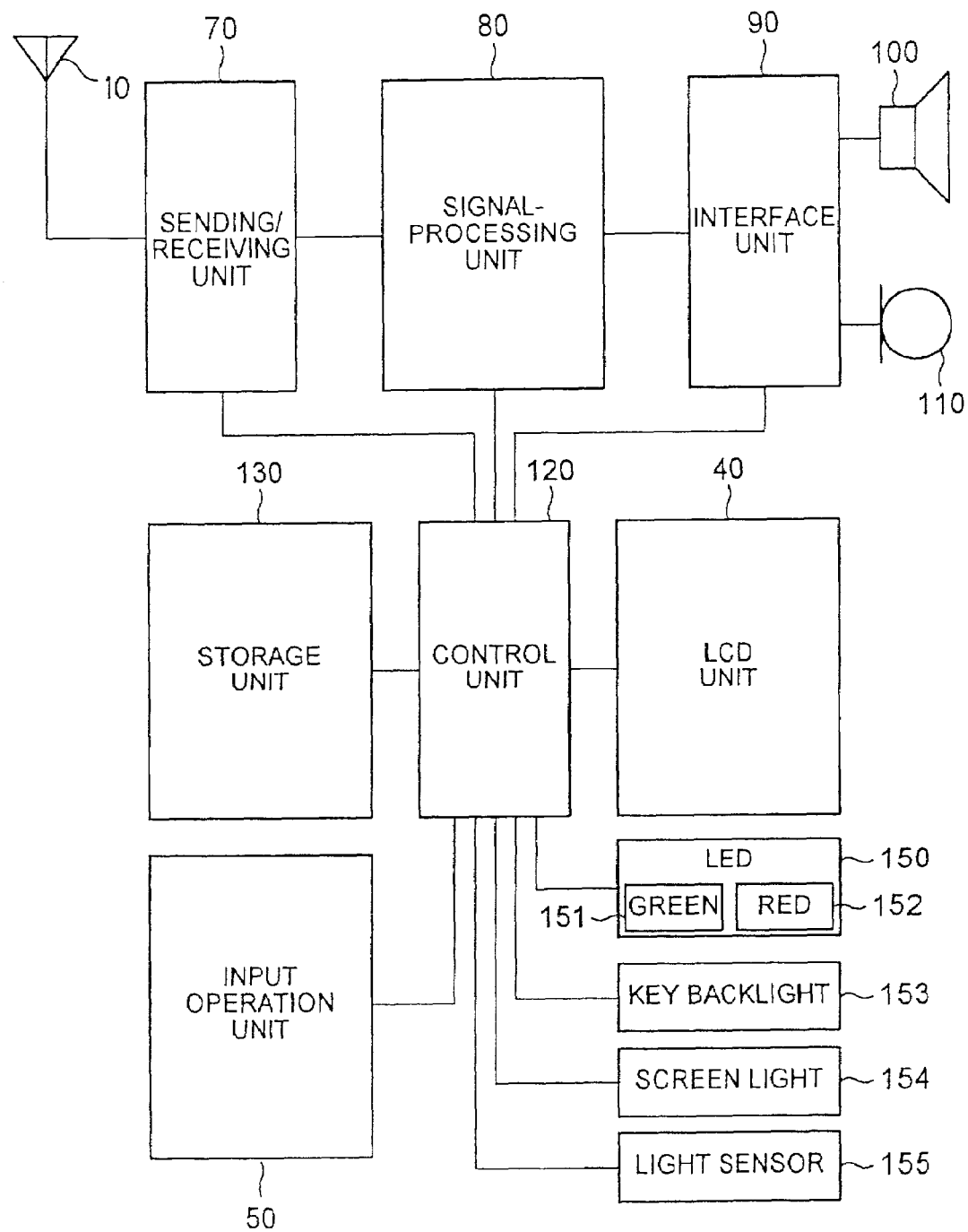
FIG. 2 is a view showing an internal circuit block diagram of the mobile phone 1 of which external view is shown in FIG. 1.

All these keys 51–55 are made of a semitransparent material and can be seen in a dark place as they are lighted from the inside of the mobile phone 1 by a key backlight 153 shown in a block diagram of FIG. 2.

Moreover, since the LCD unit 40 is also lighted by a screen light 154 shown in the block diagram of FIG. 2, it is easy to see a screen displayed there. However, when the keys are operated in a bright place, the key backlight 153 is put out so that the power is saved.

FIG. 2 is a view showing an internal circuit block diagram of the mobile phone 1 of which external view is shown in FIG. 1.

A radio wave received by the antenna 10 is picked up by a sending/receiving unit 70 to take out a signal that is sent to a signal-processing unit 80.

Also, the sending/receiving unit 70 notifies a control unit 120 of a call when it arrives.

The signal-processing unit 80 divides a signal sent from the sending/receiving unit 70 into a voice signal and an image or a character signal, and sends the voice signal to an interface unit 90 as well as sends the image signal or the character signal to the control unit 120. The interface unit 90 sends the voice signal sent from the signal processing 80 to a speaker 100 and a voice is output from the speaker 100.

On the other hand, when sending a message, a voice signal picked up by a microphone 110 is sent to the sending/receiving unit 70 via the interface unit 90 and the signal-processing unit 80, and the sending/receiving unit 70 converts the voice signal into a signal to be put on a radio wave and sends it to the antenna 10 to emit it as a radio wave into a space.

In a storage unit 130, various voices and screens have been stored and can be additionally stored.

An LCD unit 40 shown in FIG. 2 corresponds to the LCD unit 40 shown in FIG. 1, and an input operation unit 50 shown in FIG. 2 corresponds to the input operation unit 50 shown in FIG. 1.

The control unit 120 reads out a receipt-waiting screen from the storage unit 130 and displays it on the LCD unit 40 in a receipt waiting state. When notified by the sending/receiving unit 70 of an arrival of a call, in order to indicate such an arrival of a call, the control unit 120 reads out a receipt melody from the storage unit 130 to let the speaker 100 make the sound of the receipt melody via the signal-processing unit 80 and the interface unit 90, as well as uses a light by turning on the green LED 151 of the bicolor LED 150. Further, when notified of an arrival of a call, the control unit 120 turns on the screen light 154 to light up the LCD unit 40 and turns on the key backlight 153 when it is dark around the mobile phone.

Also, the control unit 120 makes calls according to operations in the input operation unit 50, stores various setting conditions to be made according to operations performed on the input operation unit 50 in the storage unit 130, or controls display screens in the LCD unit 40. Further, during a battery (not shown) is being charged up, the control unit 120 indicates a charging state by turning on the red LED 152 of the bicolor LED 150.

Figure 3:
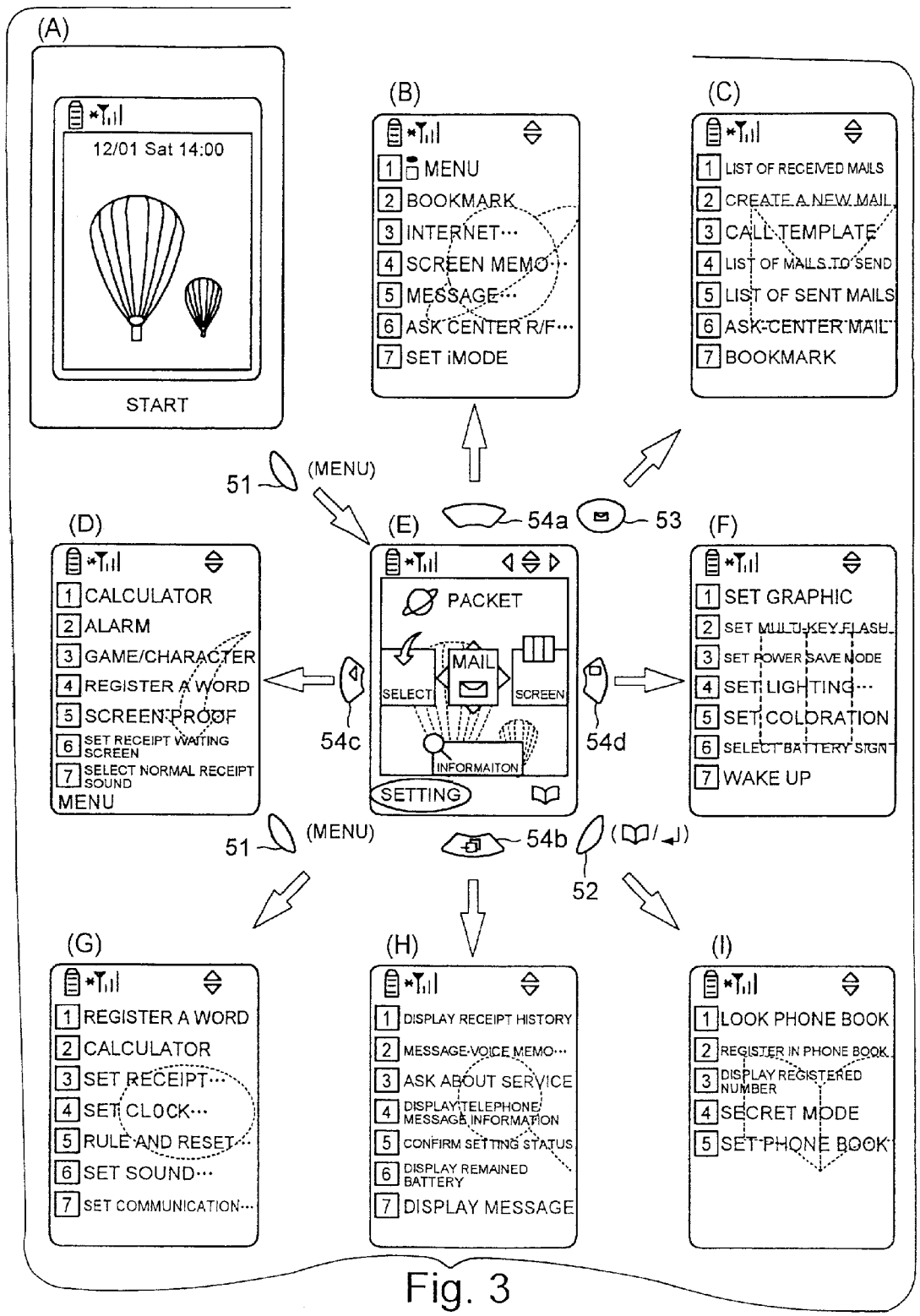
FIG. 3 is a view showing changes of menu screens displayed in an LCD unit, made by key operations.

FIG. 3 is a view showing changes of menu screens displayed in an LCD unit, made by key operations.

A state that a receipt-waiting screen is displayed is shown in part (A) of FIG. 3, and when the receipt-waiting screen is displayed, if a menu key 51 in the upper left of the input operation unit 50 shown in FIG. 1 is pressed, the first menu screen shown in part (E) of FIG. 3 is displayed. The menu screen shown in part (E) of FIG. 3 is an example of the first menu screen according to the present invention. This menu screen is a menu screen having a design that several small screens are arranged on the receipt-waiting screen, and each small screen on the menu screen corresponds to each typy operation position (each key) shown round part (E) of FIG. 3. Here, the menu screen that shown in part (E) of FIG. 3 is called a graphical menu.

The graphical menu has the receipt-waiting screen as a background screen, by displaying the receipt-waiting screen, it is easy to notice that the graphical menu is the first menu screen.

In a state that the graphical menu shown in part (E) of FIG. 3 is displayed, if the upper part 54*a* (an upper key) of the key 54 shown in FIG. 1 is pressed, a menu screen shown in part (B) of FIG. 3 corresponding to a small screen "PACKET" on the upper side of the LCD unit shown in part (E) of FIG. 3 is displayed. Similarly, if the lower part 54*b* (a lower key), the left part 54*c* (a left key) and the right part 54*d* (a right key) of the key 54 shown in FIG. 1 are pressed, menu screens shown in parts (H), (D) and (F) of FIG. 3 respectively corresponding to the lower side small screen "INFORMATION", the left side small screen "SELECT" and the right side small screen "SCREEN" in the LCD unit are displayed.

Further, when the graphical menu shown in part (E) of FIG. 3 is displayed, if the decision key 53 shown in FIG. 1 is pressed, a menu screen shown in part (C) of FIG. 3 corresponding to the central small screen "MAIL" in part (E) of FIG. 3 is displayed.

Moreover, when the graphical menu shown in part (E) of FIG. 3 is displayed, the left soft key 51 and the right soft key 52 are pressed, menu screens in part (G) and (I) of FIG. 3 respectively corresponding to the lower left small screen "SETTING" and the lower right small screen (a book-shaped sign) are displayed. Here, except for the receipt-waiting screen shown in part (A) and the graphical menu shown in part (E) of FIG. 3, each screen shown in parts (B), (C), (D), (F), (G), (H) and (I) of FIG. 3 corresponds to the second menu screen according to the present invention.

In each second menu screen, a menu shown in characters as well as a background screen reminding a user of a category that varies with each second menu screen are displayed. By this background screen, without thinking of a category, it is possible for a user by the light of nature to know a category of a menu screen being displayed reading a menu displayed.

After any of the second menu screens is displayed, by operation ways similar to those used in conventional techniques, any of options in a list shown in the menu screen displayed is selected and a process according to the selected option is executed.

Figure 4:
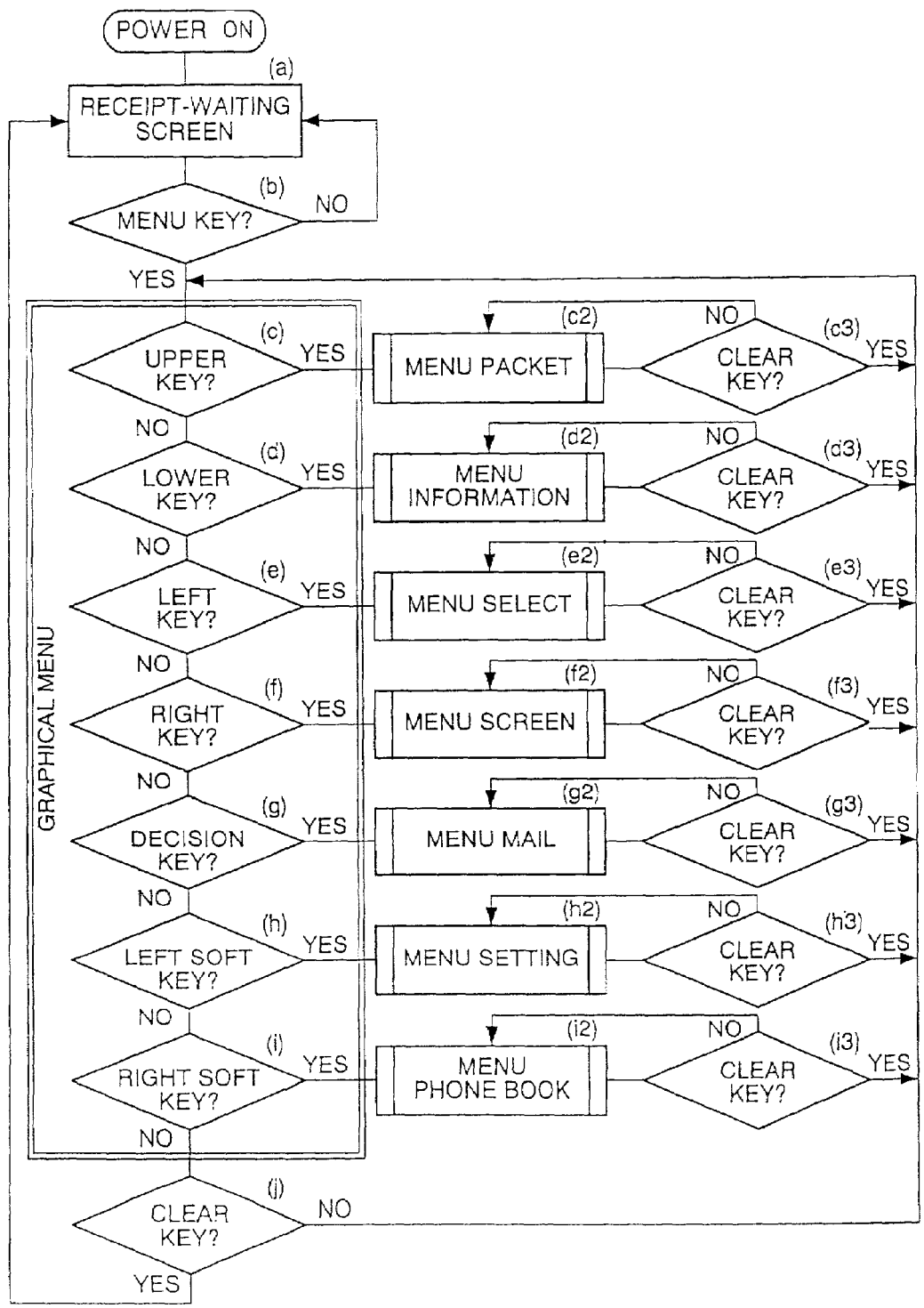
FIG. 4 is a flowchart showing a menu screen display routine.

FIG. 4 is a flowchart showing a menu screen display routine which is executed in the control unit 120 shown in FIG. 2.

When the mobile phone is turned on, the receipt-waiting screen shown in part (A) of FIG. 3 is displayed in the LCD unit (step a), and whether the menu key (the key 51 shown in FIG. 1) is pressed or not is detected (step b).

If the menu key 51 is pressed, the graphical menu shown in part (E) of FIG. 3 is displayed. And in a state that the graphical menu is displayed, if any of the upper key 54a, the lower key 54b, the left key 54c, the right key 54d, the decision key 53, the left soft key 51 and the right soft key 52 is pressed (step c, d, . . . i), a menu screen corresponding to the pressed key is displayed (step c2, d2, . . . i2). And in a state that the graphical menu shown in part (E) of FIG. 3 is displayed, if the clear key 55a is pressed (step j), the flow returns to display of the receipt-waiting screen (step a). In a state that the menu screen of each category is displayed, if the clear key 55a is pressed (step c3, d3, . . . i3), the flow returns to the graphical menu.

In the present embodiment, as described above, since the graphical menu that displays the small screens reminding a user of each category on the display positions corresponding to the positions of the arranged keys (operation positions of the operation panel) is provided, the user finds by the light of nature which key should be pressed next and operability improves. Also, by keeping the receipt-waiting screen as a background screen in the graphical menu screen, the design of the graphical menu screen becomes better and a user finds in a moment that this is the screen for selecting a category.

Further, also in the menu screens that vary with the category, by displaying a background screen reminding a user of a category that belongs to a menu screen, it is possible to find the category of the displayed menu screen by the light of nature.

The above-described embodiment is an example in which the present invention is applied to a mobile phone. However, the present invention can be widely applied to not only mobile phones but also PHS phones or other portable terminals.

As described above, according to the present invention, operability of a portable terminal can be further improved.

What is claimed is:

1. A portable terminal, comprising:
    a display unit displaying a screen;
    an operation panel generating an event according to an operation position; and
    a display control unit displaying:
        a first menu screen displaying a plurality of small screens corresponding to a plurality of categories associated with a plurality of operation positions of the operation panel in response to a predetermined menu display operation performed on the operation panel, where the small screens are displayed on each of a plurality of display positions of the display unit that are respectively associated with the plurality of operation positions, and
        a second menu screen corresponding to one of the categories associated with one of the small screens displayed on one of the display positions of the display unit in accordance with an the operated operation position responsive to any of the operation positions being operated in a state when the first menu screen is displayed, and
        a predetermined receipt-waiting screen on the display unit when the portable terminal is turned on.

2. The portable terminal according to claim 1, wherein the display control unit displays the predetermined receipt-waiting screen on the display unit when the portable terminal is turned on, and displays the first menu screen having the small screens superimposed on the receipt-waiting screen in response to the menu display operation.

3. The portable terminal according to claim 1, wherein in response to any of the operation positions being operated in the state that the first menu screen is displayed on the display unit, the display control unit displays the second menu screen having a menu corresponding to a category provided on a background screen associated with the category which corresponds to a small screen displayed on a display position of the display unit corresponding to the operated operation position.

* * * * *

UNITED STATES PATENT AND TRADEMARK OFFICE
CERTIFICATE OF CORRECTION

PATENT NO. : 7,155,260 B2 Page 1 of 1
APPLICATION NO. : 10/062770
DATED : December 26, 2006
INVENTOR(S) : Eiichi Tanaka et al.

It is certified that error appears in the above-identified patent and that said Letters Patent is hereby corrected as shown below:

Column 6, line 19, after "with an" delete "the".

Signed and Sealed this

Third Day of April, 2007

JON W. DUDAS
*Director of the United States Patent and Trademark Office*